(12) United States Patent
Yasuhiro

(10) Patent No.: US 9,177,390 B2
(45) Date of Patent: Nov. 3, 2015

(54) OPTICAL FLOW MEASUREMENT DIVIDE

(75) Inventor: Sawada Yasuhiro, Tokyo (JP)

(73) Assignee: Intel Corporation, Santa Clara, CA (US)

( * ) Notice: Subject to any disclaimer, the term of this patent is extended or adjusted under 35 U.S.C. 154(b) by 597 days.

(21) Appl. No.: 13/538,222

(22) Filed: Jun. 29, 2012

(65) Prior Publication Data

US 2013/0176427 A1    Jul. 11, 2013

Related U.S. Application Data

(60) Provisional application No. 61/584,776, filed on Jan. 9, 2012.

(51) Int. Cl.
  *H04N 7/18*    (2006.01)
  *G06T 7/20*    (2006.01)

(52) U.S. Cl.
  CPC ............ *G06T 7/206* (2013.01); *G06T 2200/28* (2013.01); *G06T 2207/10016* (2013.01); *G06T 2207/20021* (2013.01); *G06T 2207/20056* (2013.01)

(58) Field of Classification Search
  USPC ........................... 348/135; 375/240.02–240.2
  See application file for complete search history.

(56) References Cited

U.S. PATENT DOCUMENTS

| | | | | |
|---|---|---|---|---|
| 4,890,160 | A * | 12/1989 | Thomas | 348/429.1 |
| 7,751,482 | B1 * | 7/2010 | Srinivasan et al. | 375/240.16 |
| 7,773,819 | B2 | 8/2010 | Hiraga et al. | |
| 2010/0305857 | A1 * | 12/2010 | Byrne et al. | 701/301 |

FOREIGN PATENT DOCUMENTS

JP    4620607 B2    1/2011

OTHER PUBLICATIONS

Christian Piguet, Low-Power Processors and Systems on Chips, 2006, CRC Press.*
Fahad Qureshi and Oscar Gustafsson, Analysis of Twiddle Factor Memory Complexity of Radix-2i Pipelined FFTs, IEEE 2009.*
Eleanor Chu and Alan George, Inside the FFT Black Box, CRC Press 1999, Chapter 24.*
CalcOpticalFlowHS, OpenCV 2.4.9.0 documentation, http://docs.opencv.org/modules/legacy/doc/motion_analysis.html, Apr. 21, 2014, 1 page, retrieved Jan. 26, 2015.

* cited by examiner

*Primary Examiner* — Andy Rao
(74) *Attorney, Agent, or Firm* — Jordan IP Law, LLC

(57) ABSTRACT

Systems and methods may provide for identifying a plurality of areas in an image frame, and using fixed functionality logic to determine phase information for the image frame on an area-by-area basis. Additionally, a programmable processor can be used to identify motion associated with the image frame based at least in part on the phase information.

27 Claims, 3 Drawing Sheets

OPTICAL FLOW MEASUREMENT DIVIDE

CROSS REFERENCE TO RELATED APPLICATIONS

The present application claims the benefit of priority to U.S. Provisional Patent Application No. 61/584,776, filed on Jan. 9, 2012.

BACKGROUND

1. Technical Field

Embodiments generally relate to image processing. More particularly, embodiments relate to the division of optical flow analysis activities between fixed functionality and programmable image processing resources.

2. Discussion

Optical flow (as indicated in a motion vector) may be a commonly used technique to track inter-frame motion within video and burst captured still images. Motion vectors can also be used for video compression, stabilization, motion capture, and so on.

Algorithms presented for use with motion vectors may have issues such as a general need of a reference frame in order to be implemented in randomly accessible memory (which can typically require use of a frame buffer). In addition, computing loads, memory access patterns and the locations where motion is detected may all vary based on context and other non-deterministic processes, wherein such variability can present additional implementation challenges.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include a method of detecting motion in which a plurality of areas are identified in an image frame. The method may also provide for using fixed functionality logic to determine phase information for the image frame on an area-by-area basis, and using a programmable processor to identify motion associated with the image frame based at least in part on the phase information.

Embodiments may also include a device having fixed functionality logic to determine phase information for an image frame on an area-by-area basis, a programmable processor, and memory including a set of instructions. If executed by the programmable processor, the instructions can cause the programmable processor to identify a plurality of areas in the image frame, and identify motion associated with the image frame based at least in part on the phase information.

Additionally, embodiments may include a system having a camera to capture an image frame and a programmable processor. The system may also have memory with a set of instructions which, if executed by the programmable processor, cause the programmable processor to identify a plurality of areas in the image frame. The system may also have fixed functionality logic to determine phase information for the image frame on an area-by-area basis, wherein the instructions, if executed by the programmable processor, further cause the programmable processor to identify motion associated with the image frame based at least in part on the phase information.

Figure 1:
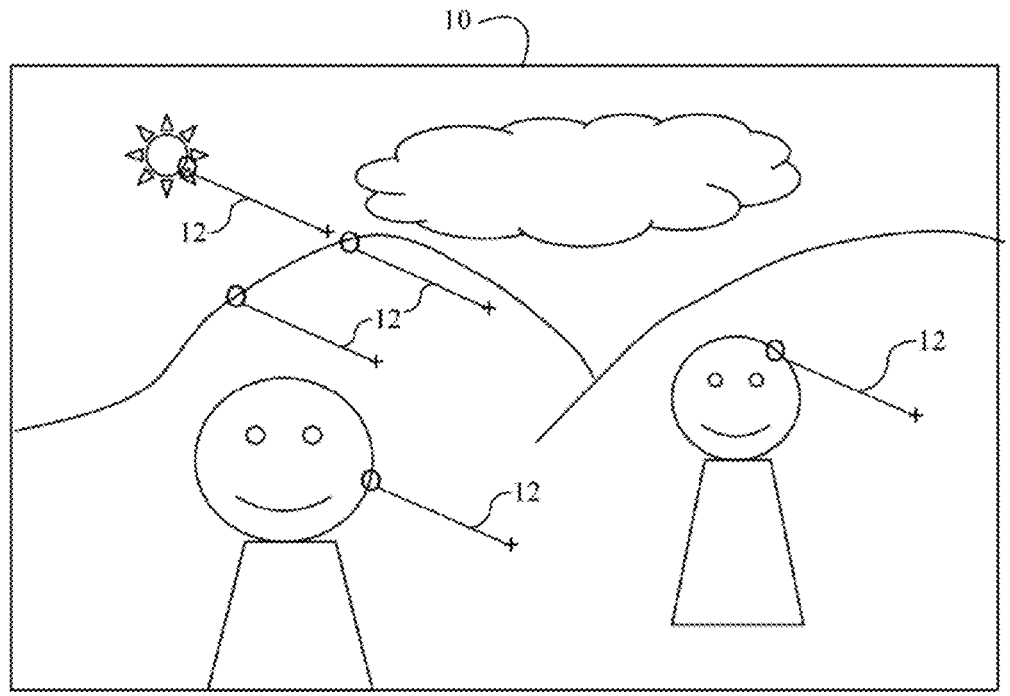
FIG. 1 is an illustration of an example of an image frame having motion vectors mapped thereon according to embodiments.

Turning now to FIG. 1, an image frame 10 is shown in which motion vectors 12 identify movement between frames. In the illustrated example, the circle signs ("o") reflect the current pixel location and the plus signs ("+") reflect the location of the same pixel in a previous frame. Thus, the illustrated example corresponds to a scenario in which the scene is moving from right to left (e.g., the camera is panning left to right). As will be discussed in greater detail, an approach may be used to determine the motion vectors 12 in which the motion detection responsibilities are optimally divided between fixed functionality logic and programmable processing resources.

Figure 2:
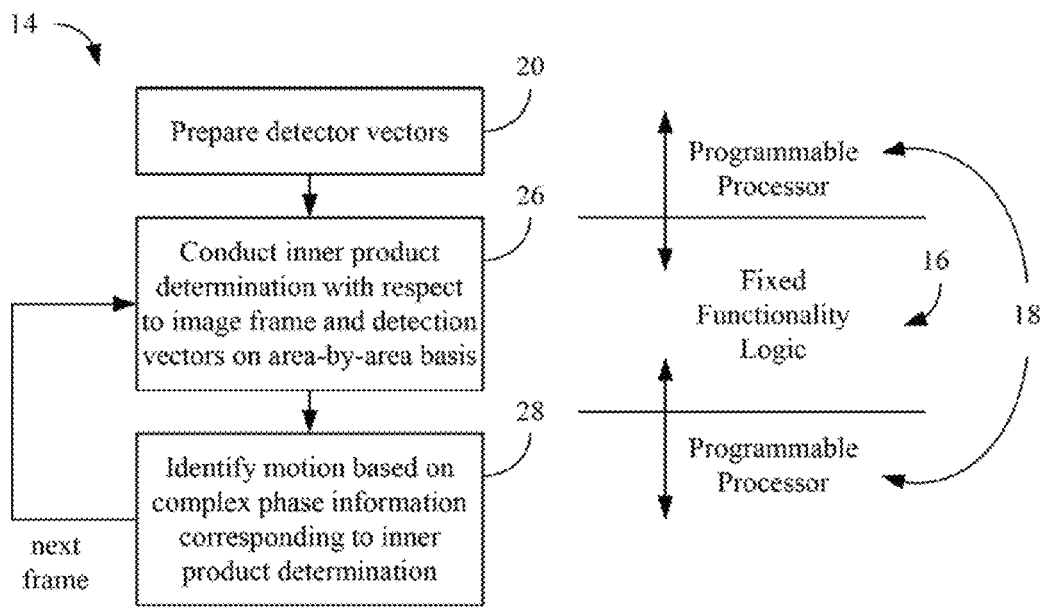
FIG. 2 is a flowchart of an example of a method of detecting motion according to an embodiment.

FIG. 2 shows a method 14 of detecting motion. The method 14 may be generally implemented as a set of logic instructions stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, digital signal processor (DSP), application specific integrated circuit (ASIC), complementary metal oxide semiconductor (CMOS) or transistor-transistor logic (TTL) technology, or any combination thereof. In the illustrated example, a first portion 16 of the method 14 is implemented in fixed functionality logic, whereas a second portion 18 of the method 14 is implemented in a programmable processor. For example, the first portion 16 of the method 14 could be implemented using any of the aforementioned circuit technologies. Moreover, computer program code to carry out operations shown in the second portion 18 may be written in any combination of one or more programming languages, including an object oriented programming language such as C++ or the like and conventional procedural programming languages, such as the "C" programming language or similar programming languages.

Figure 3:
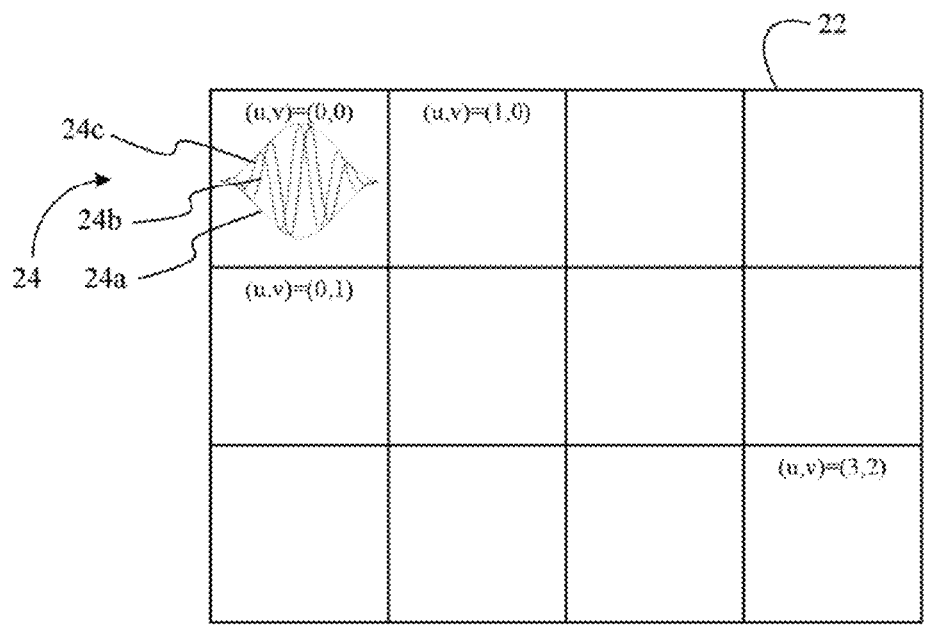
FIG. 3 is a block diagram of an example of a plurality of multi-pixel areas according to an embodiment.

In the illustrated example, motion (e.g., optical flow) is determined for one axis, wherein the motion determination can be repeated for another axis to obtain two dimensional (2D) motion vectors such as the aforementioned motion vectors 12 (FIG. 1). Illustrated processing block 20 provides for preparing detector vectors for the motion determination. As will be discussed in greater detail, the image frame to be analyzed can be partitioned into a plurality of areas. FIG. 3 show an example of an area map 22 in which a VGA (video graphics array) monochrome image frame is divided into twelve areas, (u,v)=(0,0)~(3,2). A detector vector 24 (24a-24c) having a windowing function 24a that encompasses a real component 24b and an imaginary component 24c, can be determined for the image frame on an area-by-area basis.

Preparation of the detector vectors may involve setting the size of the areas as well as a range parameter/distance, wherein user input could be used to determine the area size and/or range parameter. The range parameter may be the amount of inter-frame motion that can be tracked, wherein inter-frame motion greater than the range parameter may be generally untraceable. As will be discussed in greater detail, the range parameter may be used to set a wavelength parameter ("λ") of the detector vectors. The detector vectors can also be a function of the area size. In one example, the detector vectors implement Euler's formula with a windowing function. For example, if an area has width of 160 pixels, a Euler's formula based detector vector for the area may be given by, $$\text{Detector}(x) = \exp(-2\pi j x/\lambda) \sin(\pi x/w) \quad (1)$$

where "j" refers to a complex unit, "w" refers to the width of the area, and "λ" refers to a wavelength parameter that establishes a Fourier transformation frequency of the detector vectors. In one example, the Fourier transformation wavelength is set to be at least double the range parameter. The detector vectors may be retrieved from memory (e.g., ROM), computed at runtime by a programmable processor, etc. Returning to FIG. 2, of particular note is that the detector vector preparation process may be conducted by a programmable processor, which can be well suited for non-deterministic processes such as the determination of user defined area sizes, and so forth.

Illustrated block 26 provides for conducting an area specific inner product determination with respect to the image frame and each detector vector. More particularly, when a frame #f is captured, the inner product of image data in each area and the detector vector for each area (u,v) may be calculated as follows.

$$\text{InnerProduct}_{u,v}(f) = \Sigma_x \Sigma_y \text{Img}(x,y;f) \text{Detector}(x) \text{ for } \{x,y\} \in \text{area}_{u,v} \quad (2)$$

where Img(x,y;f) is an $f^{th}$ frame data of pixel intensities. Expression (2) could be computed as follows with fewer multiplications:

$$\text{InnerProduct}_{u,v}(f) = \Sigma_x (\Sigma_y \text{Img}(x,y;f)) \text{Detector}(x) \text{ for } \{x,y\} \in \text{area}_{u,v} \quad (3)$$

When the areas are deployed over the frames, the computational load of expression (3) may be, $$2 \times \text{ScalarAdd} + 2(1/\text{AreaHeight}) \times \text{ScalarMulAdd/pixel} \quad (4)$$

where "ScalarAdd" is a scalar addition operation, "ScalarMulAdd" is a scalar multiplication and addition operation, and "AreaHeight" is the height of the area. Approximating the second term of expression (4) to be negligible, the computational load may simply be approximately two scalar addition operations per pixel. The inner product determination may therefore be readily suitable for implementation in fixed functionality logic 16 as shown in the illustrated method 14.

Taking into consideration the fact that Detector(x) may be an implementation of Euler's formula, the inner products can be constituents of the frequency (1/λ) of a Fourier transformation, as already noted.

Figure 4:
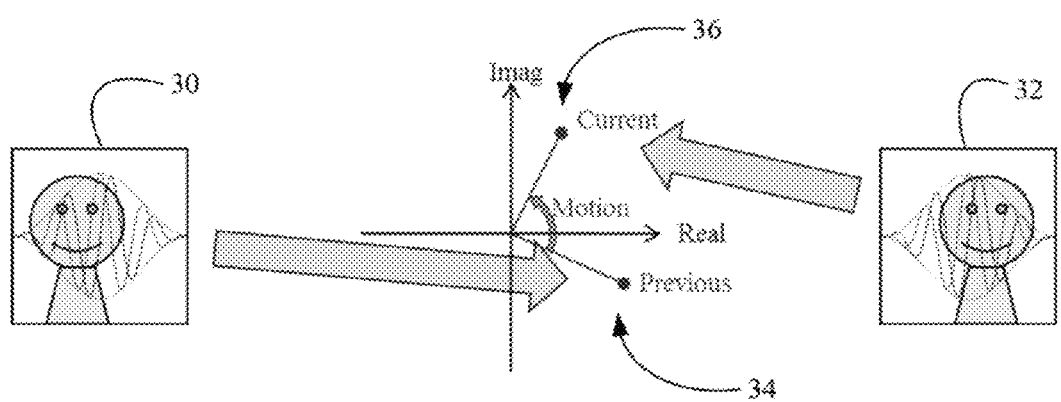
FIG. 4 is a block diagram of an example of a phase angle analysis according to an embodiment.

The inner product determinations may therefore provide complex phase information for each area in the image frame. Illustrated block 28 provides for using a programmable processor to identify motion associated with the image frame based at least in part on the complex phase information. FIG. 4 demonstrates one approach to identifying motion with respect to a previous frame 30 and a current frame 32. In general, previous complex phase information 34 corresponding to the previous frame 30 and current complex phase information 36 corresponding to the current frame 32 may be used to identify a complex phase angle that characterizes motion between frames.

More particularly, phase angles of the calculated inner products can be compared with a previous frame for each area, wherein phase angle differences between the current frame 32 and the previous frame 30 may constitute motion as given by the expression, $$\text{Motion}_{u,v}(f) = \text{phaseangle}(\text{InnerProduct}_{u,v}(f) \times \text{conjugate}(\text{InnerProduct}_{u,v}(f-1))) \times \lambda/2\pi \quad (5)$$

where "InnerProduct" is the result of equation (2) or (3). Reliabilities of the motion determinations may be calculated with the amplitude of the inner products as given by the expression, $$\text{Rel}_{u,v}(f) = \text{abs}(\text{InnerProduct}_{u,v}(f) \times \text{conjugate}(\text{InnerProduct}_{u,v}(f-1))) = \text{abs}(\text{InnerProduct}_{u,v}(f) \times \text{abs}(\text{InnerProduct}_{u,v}(f-1)) \quad (6)$$

If an area has low contrast context, the calculated motion may be unreliable because noise is dominant. Accordingly, the reliability $\text{Rel}_{u,v}(f)$ may become relatively small for such areas.

Figure 5:
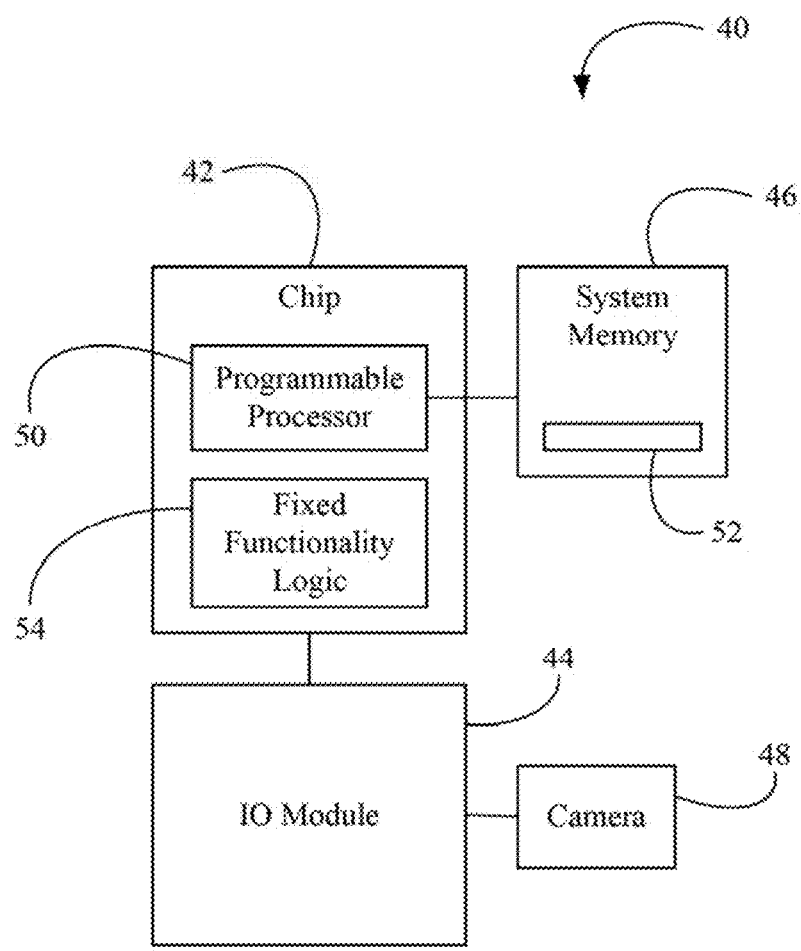
FIG. 5 is a block diagram of an example of a system according to an embodiment.

FIG. 5 shows a system 40 that may be part of a mobile platform such as a digital camera, laptop, personal digital assistant (PDA), wireless smart phone, media player, imaging device, mobile Internet device (MID), any smart device such as a smart phone, smart tablet and so forth, or any combination thereof. The system 40 may also be part of a fixed platform such as a personal computer (PC), smart TV, server, workstation, etc. The illustrated system 40 includes a chip 42, an input/output (IO) module 44, system memory 46 and a camera 48. The camera 48 may capture video and/or burst mode still images, wherein the captured content includes image frames. The chip 42 can have a programmable processor 50 and a set of instructions 52 stored in the system memory 46, wherein the system memory 46 could include, for example, double data rate (DDR) synchronous dynamic random access memory (SDRAM, e.g., DDR3 SDRAM JEDEC Standard JESD79-3C, April 2008) modules. The modules of the system memory 66 may be incorporated into a single inline memory module (SIMM), dual inline memory module (DIMM), small outline DIMM (SODIMM), and so forth.

In one example, the instructions 52, if executed by the programmable processor 50, cause the programmable processor to identify a plurality of areas in each image frame. The illustrated chip 42 also includes fixed functionality logic 54 to determine complex phase information for the image frame on an area-by-area basis, wherein the instructions 52; if executed by the programmable processor 50, further cause the programmable processor to identify motion associated with the image flame based at least in part on the complex phase information.

In one example, the fixed functionality logic is configured to conduct an area specific inner product determination with respect to the image frame and a detector vector to determine complex phase information for an area, and repeat the area specific inner product determination for the plurality areas to determine the complex phase information for the image frame. In such a case, the detector vectors may be either retrieved from memory such as system memory 46 or computed/determined by the programmable processor 50 at runtime.

An advantage of this approach may therefore be that the inner product determination is pre-deterministic and context independent, and may have a few simple computation loads. Using fixed functionality and/or highly-parallelized DSPs to conduct the inner product determination can therefore provide significant advantages with regard to processing efficiency, power consumption and battery life.

The phase angle analysis, on the other hand, may involve transcendental functions, but the number of computation can be on the order of the area count (e.g., twelve), instead of the pixel count (e.g., 640×480). Accordingly, using a programmable processor (e.g., CPU or MCU/micro control unit) under low load to conduct the phase angle analysis can further improve efficiency. In addition, the illustrated approach may involve just an area count of inner product data as information from the previous frame, which may require much less memory than a conventional frame buffer that contains the entire previous frame.

Accordingly, techniques described herein may enable the deployment of optical flow based applications (e.g., digital video/image stabilization), on low-power devices such as smart phones using a heterogeneous image signal processing system having a CPU and fixed function logic.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of 'the invention. Further, arrangements may be shown in block diagram form in order to avoid obscuring embodiments of the invention, and also in' view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code; encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components, in question, and may apply to electrical, mechanical, fluid, optical, electromagnetic, electromechanical or other connections.

In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
   a camera to capture an image frame;
   a programmable processor;
   memory including a set of instructions which, if executed by the programmable processor, cause the programmable processor to identify a plurality of areas in the image frame; and
   fixed functionality logic to determine phase information for the image frame on an area-by-area basis, wherein the instructions, if executed by the programmable processor, further cause the programmable processor to identify motion associated with the image frame based at least in part on the phase information, and wherein the fixed functionality logic is to:
   conduct an area specific inner product determination with respect to the image frame and a detector vector to determine phase information for a first area; and
   repeat the area specific inner product determination for the plurality of areas to determine the phase information for the image frame.

2. The system of claim 1, wherein Euler's formula with a windowing function is to be used as the detector vector.

3. The system of claim 2, wherein the instructions, if executed by the programmable processor, further cause the programmable processor to set a Fourier transformation wavelength for the detector vector.

4. The system of claim 3, wherein the instructions, if executed by the programmable processor, further cause the programmable processor to determine a range parameter for the image frame, wherein the Fourier transformation wavelength is to be set based at least in part on the range parameter.

5. The system of claim 4, wherein the Fourier transformation wavelength is to be at least double the range parameter.

6. The system of claim 2, wherein the instructions, if executed by the programmable processor, further cause the programmable processor to determine an area size associated with the plurality of areas, wherein the detector vector is to be a function of the area size.

7. The system of claim 6, wherein the instructions, if executed by the programmable processor, further cause the programmable processor to receive user input, wherein the area size is to be determined based at least in part on the user input.

8. The system of claim 1, wherein the instructions, if executed by the programmable processor, further cause the programmable processor to retrieve the detector vector from the memory.

9. The system of claim 1, wherein the instructions, if executed by the programmable processor, further cause the programmable processor to compute the detector vector at runtime.

10. An apparatus comprising:
    fixed functionality logic to determine phase information for an image frame on an area-by-area basis, wherein the fixed functionality logic is to:
    conduct an area specific inner product determination with respect to the image frame and a detector vector to determine phase information for a first area, and
    repeat the area specific inner product determination for the plurality of areas to determine the phase information for the image frame; and
    a programmable processor to identify a plurality of areas in the image frame, and identify motion associated with the image frame based at least in part on the phase information.

11. The apparatus of claim 10, wherein Euler's formula with a windowing function is to be used as the detector vector.

12. The apparatus of claim 11, wherein the programmable processor is to set a Fourier transformation wavelength for the detector vector.

13. The apparatus of claim 12, wherein the programmable processor is to determine a range parameter for the image frame, and wherein the Fourier transformation wavelength is to be set based at least in part on the range parameter.

14. The apparatus of claim 13, wherein the Fourier transformation wavelength is to be at least double the range parameter.

15. The apparatus of claim 11, wherein the programmable processor is to determine an area size associated with the plurality of areas, wherein the detector vector is to be a function of the area size.

16. The apparatus of claim 15, wherein the programmable processor is to receive user input, and wherein the area size is to be determined based at least in part on the user input.

17. The apparatus of claim 10, wherein the programmable processor is to retrieve the detector vector from the memory.

18. The apparatus of claim 10, wherein the programmable processor is to compute the detector vector at runtime.

19. A method comprising:
    identifying a plurality of areas in an image frame;
    using fixed functionality logic to determine phase information for the image frame on an area-by-area basis wherein determining the phase information includes:
    conducting an area specific inner product determination with respect to the image frame and a detector vector to determine phase information for a first area; and
    repeating the area specific inner product determination for the plurality of areas; and
    using a programmable processor to identify motion associated with the image frame based at least in part on the phase information.

20. The method of claim 19, wherein Euler's formula with a windowing function is used as the detector vector.

21. The method of claim 20, further including setting a Fourier transformation wavelength for the detector vector.

22. The method of claim 21, further including determining a range parameter for the image frame, wherein the Fourier transformation wavelength is set based at least in part on the range parameter.

23. The method of claim 22, wherein the Fourier transformation wavelength is at least double the range parameter.

24. The method of claim 20, further including determining an area size associated with the plurality of areas, wherein the detector vector is a function of the area size.

25. The method of claim 24, further including receiving user input, wherein the area size is determined based at least in part on the user input.

26. The method of claim 19, further including retrieving the detector vector from a memory location.

27. The method of claim 19, further including computing the detector vector at runtime.

* * * * *